US011032665B1

(12) United States Patent
George et al.

(10) Patent No.: US 11,032,665 B1
(45) Date of Patent: Jun. 8, 2021

(54) USER EQUIPMENT GEOLOCATION

(71) Applicant: AT&T Intellectual Property I, L.P., Atlanta, GA (US)

(72) Inventors: Abraham George, Litchfield, CT (US); Ye Ge, Holmdel, NJ (US); Jie Chen, Watchung, NJ (US); Wenjie Zhao, Princeton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/800,654

(22) Filed: Feb. 25, 2020

(51) Int. Cl.
| | |
|---|---|
| *H04W 4/021* | (2018.01) |
| *H04W 40/20* | (2009.01) |
| *H04W 28/02* | (2009.01) |
| *H04W 36/00* | (2009.01) |
| *G06N 3/04* | (2006.01) |
| *H04W 36/32* | (2009.01) |
| *H04B 17/318* | (2015.01) |
| *H04W 64/00* | (2009.01) |
| *G06N 3/08* | (2006.01) |

(52) U.S. Cl.
CPC .......... *H04W 4/021* (2013.01); *G06N 3/0454* (2013.01); *G06N 3/08* (2013.01); *H04B 17/318* (2015.01); *H04W 28/0226* (2013.01); *H04W 36/0061* (2013.01); *H04W 36/00835* (2018.08); *H04W 36/32* (2013.01); *H04W 40/205* (2013.01); *H04W 64/003* (2013.01)

(58) Field of Classification Search
CPC . H04W 4/021; H04W 36/32; H04W 36/0061; H04W 40/205; H04W 28/0226; H04W 36/00835; H04W 64/003; H04W 4/02–029; H04W 64/00–006; G06N 3/0454; G06N 3/08; H04B 17/318; H04M 2242/30
See application file for complete search history.

(56) References Cited

U.S. PATENT DOCUMENTS

| | | | | |
|---|---|---|---|---|
| 5,844,522 | A | * | 12/1998 | Sheffer ................ G01S 5/04 342/457 |
| 2012/0056785 | A1 | * | 3/2012 | Jovicic ............ G01S 5/0278 342/450 |

(Continued)

FOREIGN PATENT DOCUMENTS

WO    WO 2018/134587 A1 *  1/2018  .......... G06N 3/0445

*Primary Examiner* — Ronald Eisner
(74) *Attorney, Agent, or Firm* — Amin, Turocy & Watson, LLP

(57) ABSTRACT

The described technology is generally directed towards user equipment (UE) geolocation. A machine learning model can be trained to estimate UE locations based on historical network communication data associated with the UEs. In order to train the machine learning model, known previous UE locations and corresponding historical network communication data can be provided to the machine learning model. A variety of other information, such as topographical information, can also be provided to the machine learning model. The machine learning model can be trained to predict the known previous UE locations based on the corresponding historical network communication data and any other provided information. Once it is trained, the machine learning model can be deployed to estimate real-time UE locations based on historical network communication data associated with the UEs.

20 Claims, 8 Drawing Sheets

(56) References Cited

U.S. PATENT DOCUMENTS

| | | | |
|---|---|---|---|
| 2014/0323153 A1* | 10/2014 | Xiao | G01S 5/0252 455/456.2 |
| 2018/0270621 A1* | 9/2018 | Mappus | G01S 5/02 |
| 2019/0045477 A1* | 2/2019 | Edge | H04W 64/00 |
| 2019/0268721 A1* | 8/2019 | Tellado | G06N 20/00 |

* cited by examiner

USER EQUIPMENT GEOLOCATION

TECHNICAL FIELD

The subject application is related to wireless communication systems in general, including LTE, fifth generation (5G) and subsequent generation cellular communication systems.

BACKGROUND

User equipment (UE) geolocation, such as by locating users' mobile telephones and the like, is useful for a variety of reasons. For example, UE location data can be combined with wireless network measurements such as signal strength and data throughput to identify wireless network coverage holes, hot spots, and capacity issues, thereby allowing service providers to improve network performance through better planning of network topology and capacity.

In another example, real-time UE location data can provide improvements in user experience, for example when a self-organizing network uses real-time UE location data to adapt network throughput and improve end-user video quality.

Furthermore, accurate and fast UE geolocation can be essential for certain location-sensitive services such as first responders and E911 services. Dispatch teams need to locate callers in the shortest time possible, especially when global positioning system (GPS) based positioning is erratic. Moreover, GPS based methods can require high power consumption and can be difficult to scale up for millions of UEs.

In addition to the above described advantages of UE location data, numerous applications and services exist which provide many convenient and useful location-based services. However, current UE geolocation technologies have a variety of shortcomings. For example, existing UE geolocation methods often provide unsatisfactory accuracy levels, such as accuracies in the range of hundreds of meters, especially in suburban and rural areas.

Existing UE geolocation methods fall short in part because they do not make effective use of available data. Some existing UE geolocation methods rely on a single measurement type, such as radio frequency (RF) measurements, or measured distances to serving cells. Many existing UE geolocation methods ignore historical information, instead making instant measurements at a point in time and not taking into account the history of measurements made at previous times. Topographical information such as roads, forests, and building polygons are also ignored.

UE geolocation in current long term evolution (LTE) wireless networks can be particularly problematic, because the triangulation approach adopted from previous generation cellular communication systems is often ineffective due to a lack of measurements from which distances to neighbor cells can be inferred.

In view of the foregoing, there is a need in the industry for improved UE geolocation technologies for use in today's cellular communications networks.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
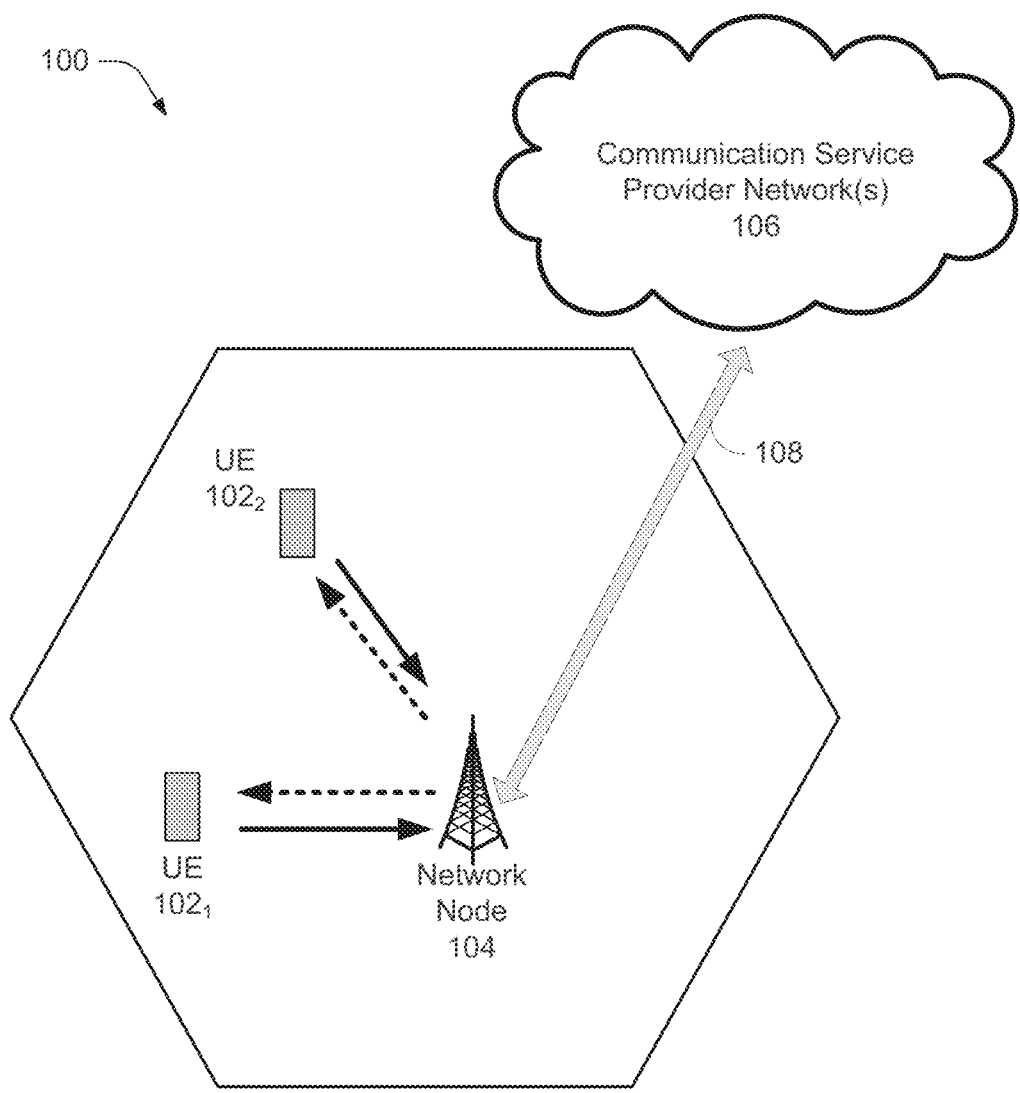
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards user equipment (UE) geolocation. A machine learning model can be trained to estimate UE locations based on historical network communication data associated with the UEs. In order to train the machine learning model, known previous UE locations and corresponding historical network communication data can be provided to the machine learning model. A variety of other information, such as topographical information, can also be provided to the machine learning model. The machine learning model can be trained to predict the known previous UE locations based on the corresponding historical network communication data and any other provided information. Once it is trained, the machine learning model can be deployed to estimate real-time UE locations based on historical network communication data associated with the UEs.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

FIG. 1 illustrates a non-limiting example of a wireless communication system 100 in accordance with various aspects and embodiments of the subject disclosure. In one or more embodiments, system 100 can comprise one or more user equipment UEs 1021, 1022, referred to collectively as UEs 102, a network node 104, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, and the like. UEs 102 can also comprise IOT devices that communicate wirelessly.

In various embodiments, system 100 comprises communication service provider network(s) 106 serviced by one or more wireless communication network providers. Communication service provider network(s) 106 can include a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop MIMO mode and/or a rank-1 precoder mode.

A network node 104 can have a cabinet and other protected enclosures, computing devices, an antenna mast, and multiple antennas for performing various transmission operations (e.g., MIMO operations). Network node 104 can comprise one or more base station devices which implement features of the network node 104. Network nodes can serve several cells, also called sectors, depending on the configuration and type of antenna. In example embodiments, UEs 102 can send and/or receive communication data via a wireless link to the network node 104. The dashed arrow lines from the network node 104 to the UEs 102 represent downlink (DL) communications and the solid arrow lines from the UEs 102 to the network node 104 represents an uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation). In an embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

As will be described further in connection with FIG. 2 and subsequent figures herein, aspects of this disclosure relate to techniques to determine locations of UEs 102. The techniques described herein can be carried out, for example, by computing devices of the communication system 100, such as computing devices at the network node 104 or within the communication service provider network(s) 106.

Figure 2:
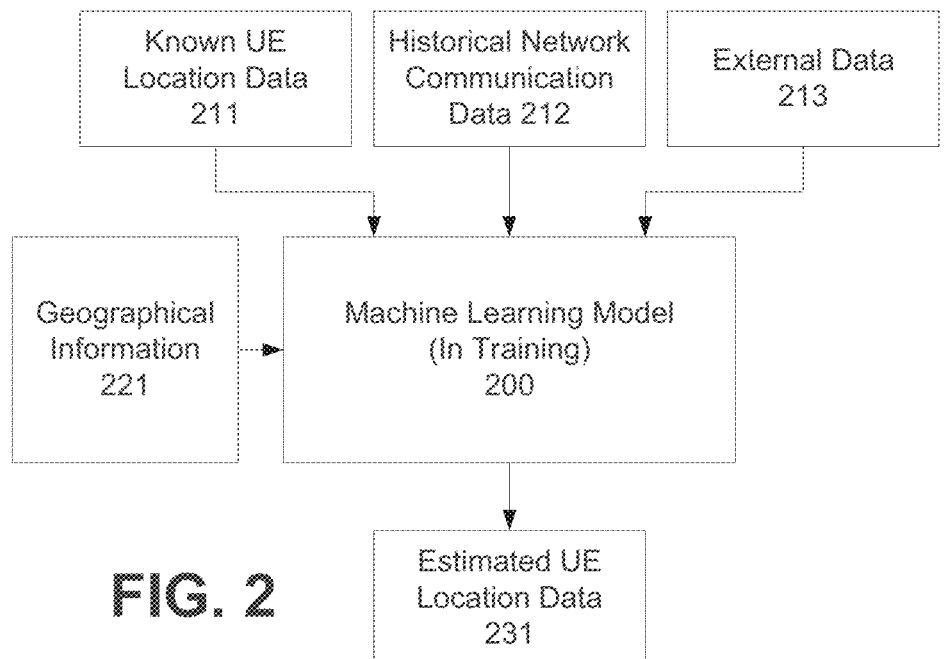
FIG. 2 illustrates training of a machine learning model to perform the UE geolocation techniques disclosed herein, in accordance with various aspects and embodiments of the subject disclosure.

FIG. 2 illustrates training of a machine learning model to perform the UE geolocation techniques disclosed herein, in accordance with various aspects and embodiments of the subject disclosure. FIG. 2 includes a machine learning model (in training) 200. The machine learning model 200 can be provided with inputs including known UE location data 211, historical network communication data 212, external data 213, and geographical information 221. The machine learning model 200 can be trained to use the inputs 211, 212, 213 and 221 to calculate estimated UE location data 231.

The geographical information 221 can comprise, e.g., a map or coordinate system that represents a real world geographical area. The known UE location data 211 can comprise, e.g., known actual locations of UEs within the geographical area represented by geographical information 221. The estimated UE location data 231 can comprise, e.g., estimated locations of UEs within the geographical area represented by geographical information 221 which are calculated using the historical network communication data 212 and, optionally, the external data 213.

The historical network communication data 212 can comprise, for any given UE associated with known UE location data 211, network communication data gathered from multiple previous network communications by the given UE. The multiple previous network communications can comprise, e.g., network communications preceding the UE having a known location represented in known UE location data 211.

Historical network communication data 212 for a given UE can comprise, for example, for each previous network communication by the given UE: a serving cell identification; timing advance (TA) information indicative of a distance between the UE and the identified serving cell; serving cell reference signal received power (RSRP) and reference signal received quality (RSRQ), which are indicative of signal strength and interference, respectively, at a serving cell; neighbor cell identifications, e.g., of neighbor cells observed by the UE; and/or neighbor cell RSRP/RSRQ, indicative of signal strength and interference, respectively, at each neighbor cell observed by the UE. Time delta information can also be included in historical network communication data 212, to indicate time intervals between each of the previous network communications for the given UE.

In an embodiment, the historical network communication data 212 can comprise historical call trace data collected from each UE. Streaming call trace records (CTR) can be reported by eNodeB s in real time for individual UEs, and historical network communication data 212 can comprise time-ordered sequences of different types of CTR events. Call trace data can comprise, e.g., the serving cell, timing advance, and other information described herein. Embodiments can conveniently leverage any call trace data collected by communication networks. However, if call trace data is not available, or if additional historical network communication data 212 is desired for a particular embodiment, then UEs or network equipment can be polled as appropriate to collect desired additional data.

In an embodiment, the historical network communication data 212 for each UE can be structured as a time sequence of K steps $S\_k$, wherein k=1, 2, . . . , K. Each step $S\_k$ can correspond to a previous network communication by the UE and can contain, but need not be limited to, the following information: serving cell; TA; serving cell RSRP/RSRQ; neighbor cells; neighbor cell RSRP/RSRQ; and time delta=t_K−t_k. where t_K, is the timestamp of the measurement collected at step k. For example, a step S_k=(serving cell, TA, serving cell RSRP/RSRQ, neighbor cell1, neighbor cell1 RSRP/, neighbor cell 2, neighbor cell2 RSRP, . . . , neighbor cell N, neighbor cell N RSRP, time delta).

The external data 213 can comprise, e.g., cell coverage information, additional geographical information, temporal information, and/or virtually any other information from which UE location probabilities can be inferred. Example cell coverage information can comprise, e.g., azimuth, beam width, and tilt of a cell to which a UE communicates. Example additional geographical information can comprise, e.g., road network location information that defines locations of roads within geographical information 221, building polygons that define locations and shapes of buildings within geographical information 221, and/or terrain type information that defines terrain at various locations within geographical information 221. Example temporal information can comprise, e.g., date, day of the week, time of day, whether the date is a holiday, etc. Temporal information can affect travel patterns and therefore locations of UEs.

In an embodiment, the machine learning model 200 can comprise software installed on a computing device (not shown in FIG. 2). The inputs 211, 212, 213 and 221 can comprise, e.g., data accessible by the machine learning model 200. In the training stage, the machine learning model 200 can be offline and the inputs 211, 212, 213 and 221 need not include real-time data.

In order to train the machine learning model 200, historical network communication data 212 can be acquired for each UE of a set of UEs. The historical network communication data 212 can include, but need not be limited to, timing advance, signal strength, serving cell and neighbor cell information, as described herein, for each of multiple previous network communications per UE. The historical network communication data 212 can be organized into time sequences of historical network communication data 212 for each UE.

The known UE location data 211 can also be acquired for each UE in the set of UEs. The known UE location data 211 can include historical location records for each given UE, optionally including multiple known locations of a given UE, during a same time period as spanned by the historical network communication data 212 for the given UE.

Any external data 213 desired for inclusion in the capabilities of the machine learning model 200 can also be acquired. The external data 213 can comprise, e.g., cell coverage information, additional geographical information, temporal information, and/or virtually any other information from which UE location probabilities can be inferred, as described herein.

Having acquired the historical network communication data 212, known UE location data 211, and any external data 213, an estimation problem can be formulated for the machine learning model 200. The estimation problem can comprise estimating the known UE location data 211 using the historical network communication data 212 and any external data 213. The machine learning model 200 can learn to solve the estimation problem to the best of the model's 200 capability. As will be described further in connection with FIG. 4, the training inputs of FIG. 2 can be used to train various different machine learning models such as, but not limited to, recurrent neural networks with Long Short Term Memory (LSTM) units. A desired machine learning model can be selected for real-time deployment in a communication network, based at least on part on the performance metrics (accuracy, precision and recall, etc.) of the various different machine learning models.

Figure 3:
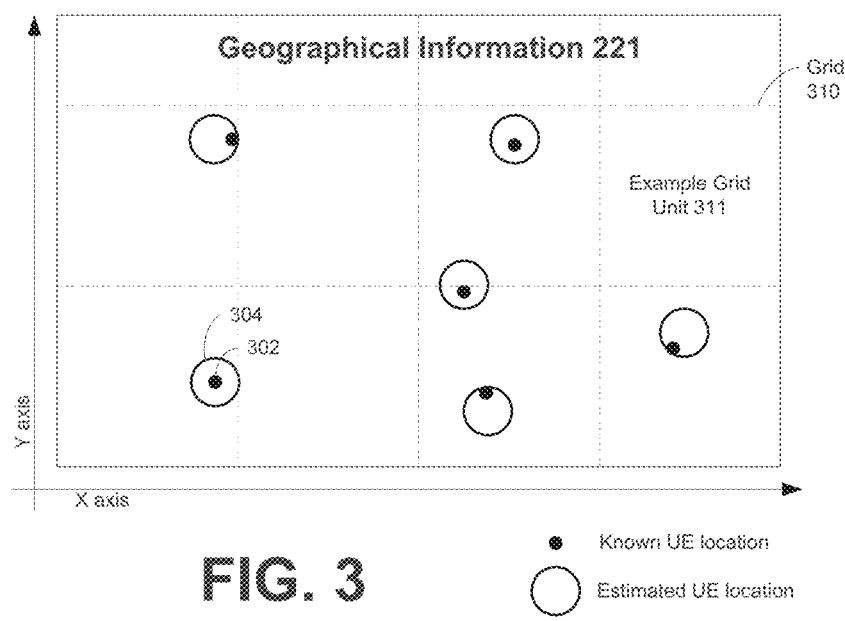
FIG. 3 illustrates known UE locations and estimated UE locations in a geographical area, in accordance with various aspects and embodiments of the subject disclosure.

FIG. 3 illustrates known UE locations and estimated UE locations in a geographical area, in accordance with various aspects and embodiments of the subject disclosure. FIG. 3 includes example geographical information 221. The geographical information 221 can comprise, e.g., a map or coordinate system or other representation of a geographical area. An example x axis and y axis are illustrated, defining a two dimensional x,y coordinate system. As another example, a grid 310 is illustrated. The grid 310 is divided into grid units such as example grid unit 311.

In addition to the geographical information 221, FIG. 3 illustrates multiple known UE locations, such as example known UE location 302, and multiple estimated UE locations, such as example estimated UE location 304. The known UE locations 302 can be mapped onto geographical information 221 based on known UE location data 211, and the estimated UE locations 304 can be mapped onto geographical information 221 based on estimated UE location data 231. During the training process described in connection with FIG. 2, the machine learning model 200 can be trained to calculate estimated UE location data 231 such that estimated UE locations 304 approximate the known UE locations 302.

Precision of the estimated UE locations 304 is represented in FIG. 3 by the radii of the estimated UE locations 304. In general, the calculations of the machine learning model can strike a balance between speed and precision. It is computationally easier for the machine learning model 200 to determine estimated UE locations 304 at a lower degree of precision (larger radius), and computationally harder for the machine learning model 200 to determine estimated UE locations 304 at a higher degree of precision (smaller radius). In an aspect of this disclosure, any desired level of precision can be selected for estimated UE location data 231, understanding that higher precision estimates come at the cost of either slower estimation speeds or more compute resources.

Figure 4:
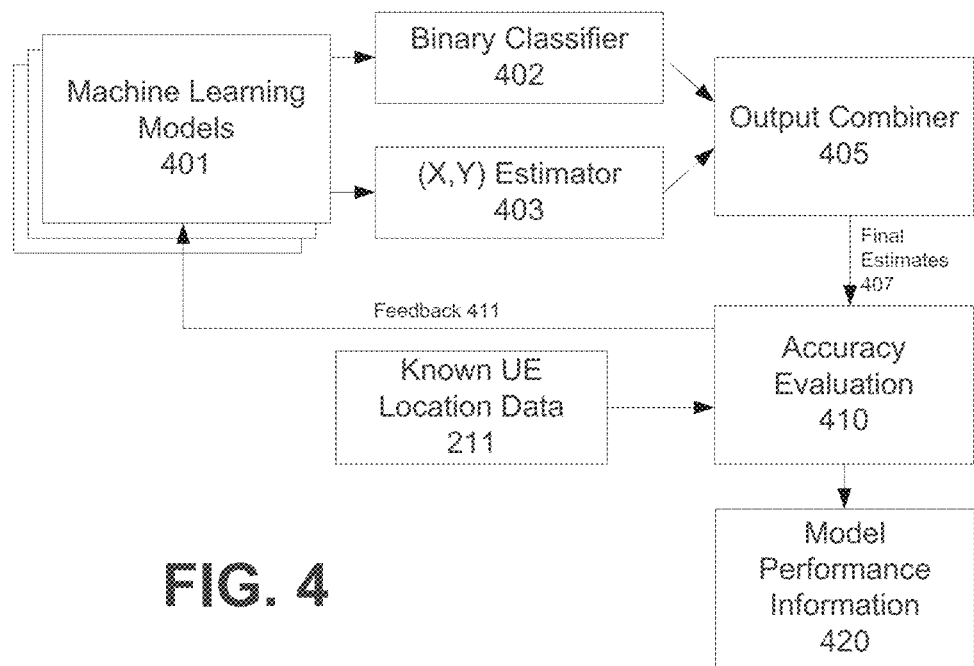
FIG. 4 illustrates operation and evaluation of multiple machine learning models in order to select a machine learning model, in accordance with various aspects and embodiments of the subject disclosure.

FIG. 4 illustrates operation and evaluation of multiple machine learning models in order to select a machine learning model, in accordance with various aspects and embodiments of the subject disclosure. FIG. 4 includes multiple machine learning models 401, binary classifier 402, (X,Y) estimator 403, and output combiner 405. FIG. 4 further includes accuracy evaluation 410, model performance information 420, and known UE location data 211.

In general, with regard to FIG. 4, a current machine learning model of multiple machine learning models 401, along with binary classifier 402, (X,Y) estimator 403, and output combiner 405, can use inputs such as illustrated in FIG. 2 to determine final estimates 407. The final estimates 407 comprise estimated UE location data 231. Accuracy evaluation 410 can then compare the final estimates 407 to the known UE location data 211, and accuracy evaluation 410 can provide feedback 411 to the current machine learning model 401. The current machine learning model 401 can use feedback 411 to refine its estimate calculations, and the illustrated cycle can be repeated to train the current machine learning model 401.

Accuracy evaluation 410 can also output model performance information 420 which can include, e.g., precision and processing time information associated with the current machine learning model 401. After a current machine learning model of machine learning models 401 has been trained and evaluated, the illustrated training and evaluation process can be repeated with a next machine learning model of machine learning models 401. The model performance information 420 for each of machine learning models 401 can be used to select a desired machine learning model for deployment, e.g., for use in real-time UE geolocation estimates.

In an example according to FIG. 4, a current machine learning model of multiple machine learning models 401 can initially estimate UE locations according to multiple different methods, represented by binary classifier 402 and (X,Y) estimator 403, and the UE location estimates produced according to the different methods can be combined by output combiner 405 in order to produce the final estimates 407.

The binary classifier 402 can be configured to partition an area covered by a serving cell into grids, e.g., partition the geographical area defined by geographical information 221 into the grid 310 as illustrated in FIG. 3. The binary classifier 402 can then estimate UE locations by estimating the probability that the UE may be located in each grid unit 311.

The (X,Y) estimator 403 can be configured to estimate X,Y coordinates of UEs directly using a regression model. For example, as illustrated in FIG. 3, X,Y coordinates of estimated UE locations 304 can be calculated using a regression model. The output combiner 405 can be configured to combine the coordinates estimated by binary classifier 402 and (X,Y) estimator 403 intelligently, i.e., by weighting the outputs of binary classifier 402 and (X,Y) estimator 403, to reduce the variance of final estimates 407, and to improve the accuracy thereof.

Example machine learning models that can be evaluated for application in the context of this disclosure include, but are not limited to, deep learning models, recurrent neural networks (RNN), optionally with Long Short Term Memory (LSTM) units, radio frequency machine learning systems, and gradient boosting machine (GBM) type machine learning models.

Figure 5:
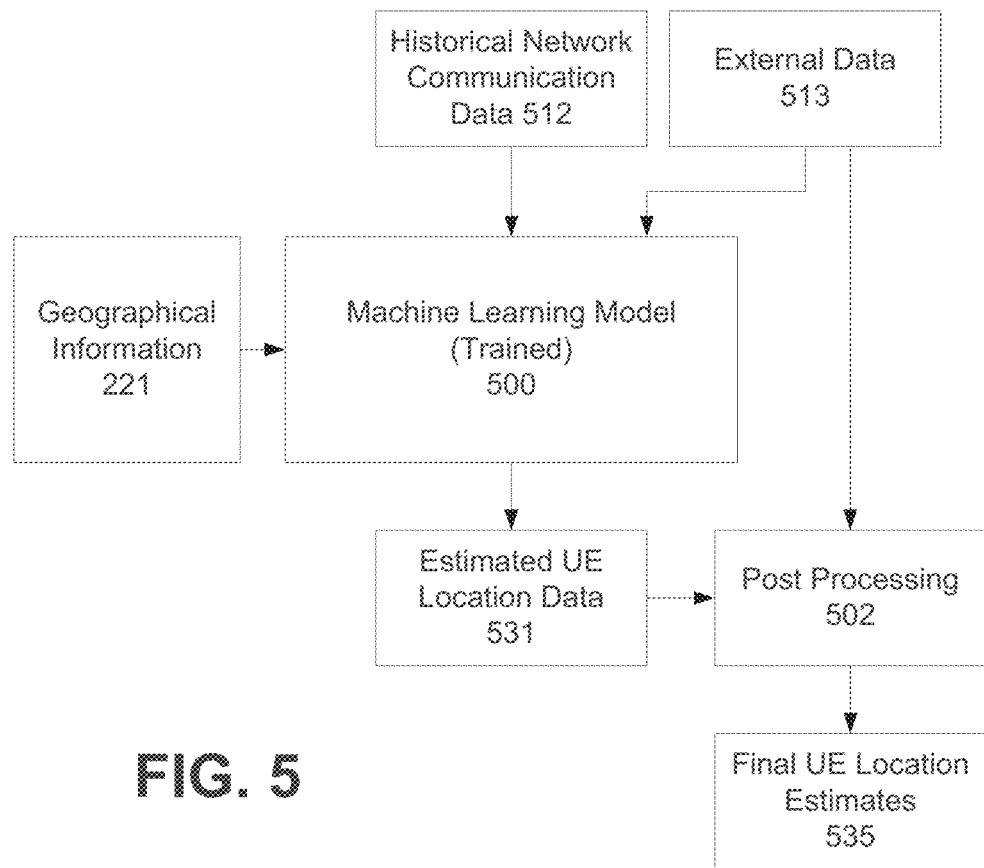
FIG. 5 illustrates a trained machine learning model to estimate UE locations in real time, in accordance with various aspects and embodiments of the subject disclosure.

FIG. 5 illustrates a trained machine learning model to estimate UE locations in real time, in accordance with various aspects and embodiments of the subject disclosure. FIG. 5 includes a machine learning model (trained) 500, historical network communication data 512, external data 513, geographical information 221, estimated UE location data 531, post processing 502, and final UE location estimates 535.

FIG. 5 illustrates several components that will be familiar from FIG. 2. The machine learning model (trained) 500 can comprise the machine learning model 200 after training thereof as described herein. FIG. 5 does not include the known UE location data 211, as that data was used for training and is generally unavailable to machine learning model 500 when making UE location estimates in real time. However, the geographical information 221 in FIG. 5 can comprise the same or similar geographical information 221 as used in training according to FIG. 2.

The historical network communication data 512 and external data 513 in FIG. 5 can include the historical network communication data 212 and external data 213 described in connection with FIG. 2, except that instead of a static historical "snapshot" of such data as may be used for training in FIG. 2, the historical network communication data 512 and external data 513 can comprise data that is updated dynamically in real-time, e.g., historical network communication data 512 can be updated for a given UE each time new network communication data, such as new call trace data, becomes available.

The estimated UE location data 531 can comprise real-time location estimates for any UE devices represented in historical network communication data 512. For example, in an embodiment, the estimated UE location data 531 can comprise real-time location estimates for substantially all UE devices connected to a cellular communication network. By saving previous estimate data, the estimated UE location data 531 can also optionally comprise historical location estimates covering up to any desired period of time, e.g., one day, one week, one month, etc.

FIG. 5 illustrates post processing 502 of estimated UE location data 531 in order to produce final UE location estimates 535. Post processing 502 can for example analyze estimated UE location data 531 along with external data 513, such as topography information including roads and building polygons, in order to move UE location estimates to high probability nearby locations, such as on roads and inside buildings.

Figure 6:
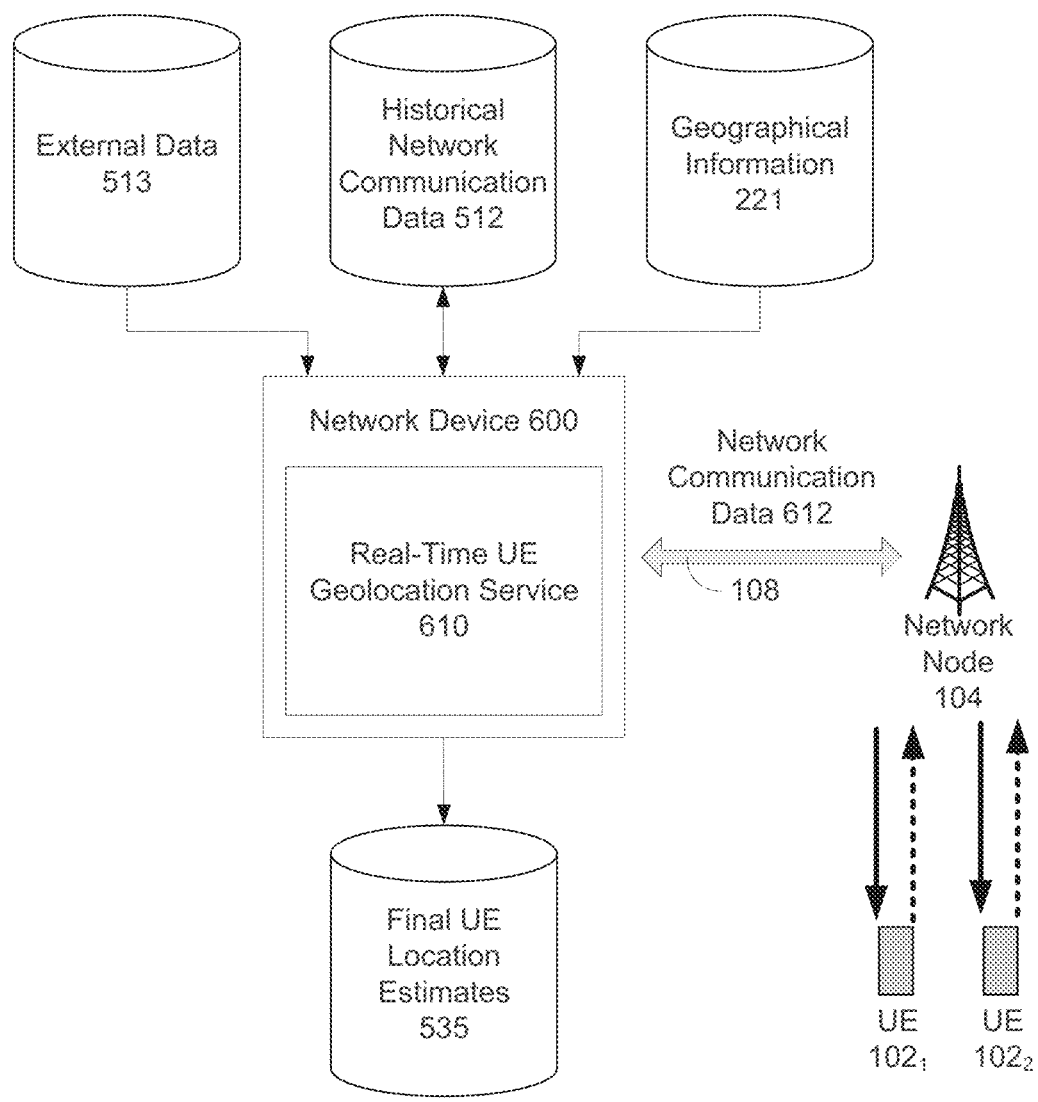
FIG. 6 illustrates a real-time UE geolocation service comprising the technologies described herein and deployed in a network device of a communication system, in accordance with various aspects and embodiments of the subject disclosure.

FIG. 6 illustrates a real-time UE geolocation service comprising the technologies described herein and deployed in a network device of a communication system, in accordance with various aspects and embodiments of the subject disclosure. FIG. 6 includes a network device 600 including a real time UE geolocation service 610. Real time UE geolocation service 610 can include a machine learning model 500 (not shown in FIG. 6), and can access external data 513, historical network communication data 512, geographical information 221, and final UE location estimates 535, all described in connection with FIG. 5.

In an embodiment, the network device 600, external data 513, historical network communication data 512, geographical information 221, and final UE location estimates 535 can be included in communication service provider network(s) 106 of a communication system 100 such as illustrated in FIG. 1. As such, the network device 600 can be communicatively coupled via backhaul links 108 to network node 104, which in turn can conduct uplink and downlink communications with UEs 102, as described in connection with FIG. 1.

The network communication data 612 can update the historical network communication data 512 in real-time. In an embodiment, the real-time UE geolocation service 610 can recalculate a final UE location estimate (of final UE location estimates 535) for a UE 1021 each time network communication data 512, e.g., call trace data, is reported for that UE 1021. At scale, the real-time UE geolocation service 610 can make, for example, on the order of thousands of UE location estimates (of final UE location estimates 535), or more, per second at a precision level within one hundred meters, or less. It will be appreciated that the speed and precision of real-time UE geolocation service 610 can be adjusted as needed to serve particular embodiments.

Figure 7:
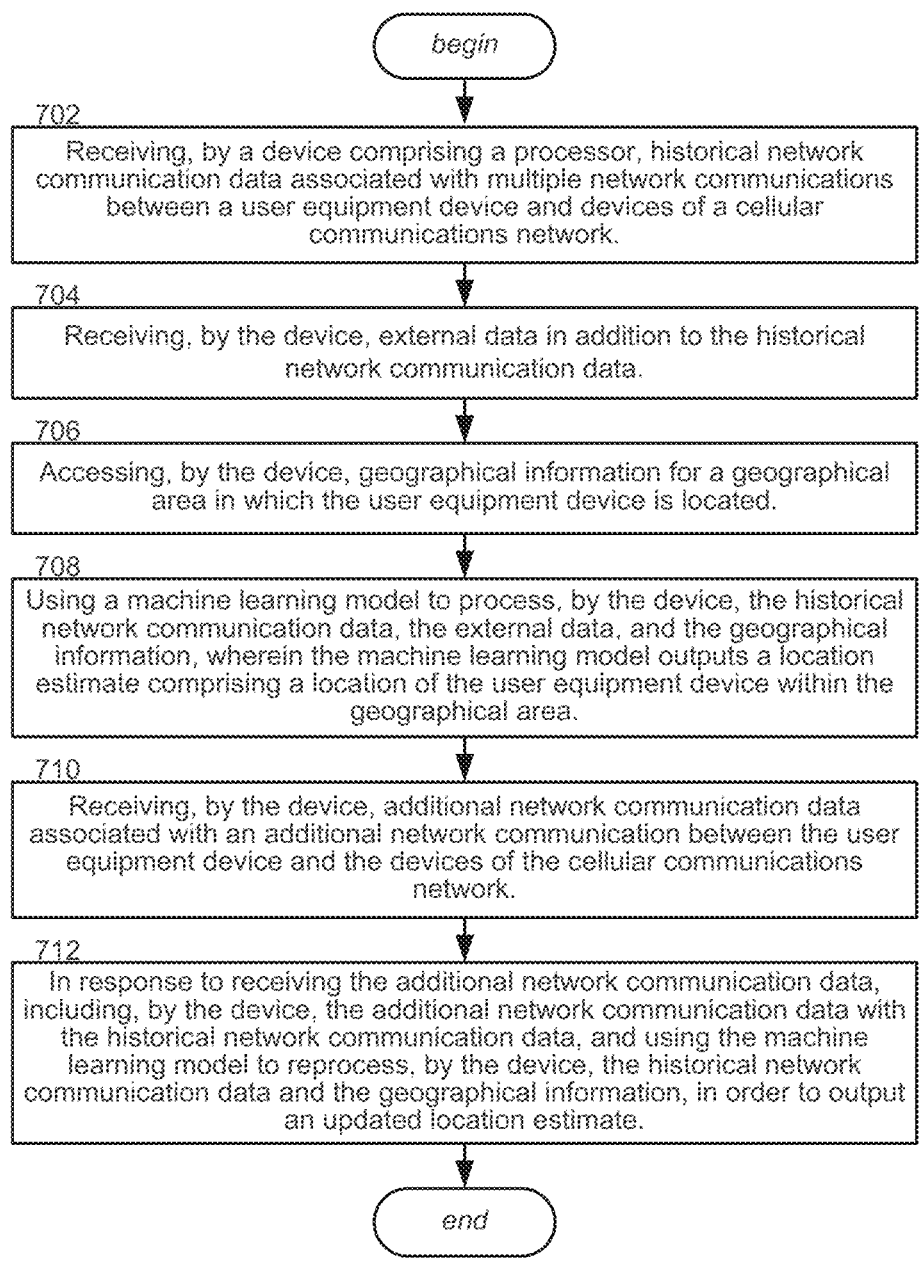
FIG. 7 is a flow diagram representing example operations of trained and deployed machine learning model to make real-time UE location estimates, in accordance with various aspects and embodiments of the subject disclosure.

FIG. 7 is a flow diagram representing example operations of trained and deployed machine learning model to make real-time UE location estimates, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 7 can be performed, for example, by network device 600 hosting a real-time UE geolocation service 610, as illustrated in FIG. 6. As described in connection with FIG. 6, the real-time UE geolocation service 610 can comprise a trained machine learning model 500. Example operations comprise operation 702, which represents receiving, by a device comprising a processor such as network device 600, historical network communication data 512 associated with multiple network communications between a user equipment (UE) device 1021 and devices of a cellular communications network 100. At 704, the device 600 can furthermore optionally receive external data 513 in addition to the historical network communication data 512. At 706, the device 600 can access geographical information 221 for a geographical area in which the UE device 1021 is located.

As described in connection with FIG. 2, the historical network communication data can comprise, for a respective network communication, respective serving cell information, respective timing advance information, respective signal strength information associated with the respective serving cell information, respective neighbor cell information, respective signal strength information associated with the respective neighbor cell information, and/or time delta information defining time differences between network communications of the multiple network communications. The external data 513 can comprise, for example, cellular coverage information associated with wireless signals of the cellular communications network 100 within the geographical area, and/or road information within the geographical area.

At 706, the device 600 can use a machine learning model 500 to process, by the device 600, the historical network communication data 512, the external data 513, and the geographical information 221, wherein the machine learning model 500 outputs a location estimate comprising a location of the UE device 1021 within the geographical area. The machine learning model 500 can comprise, e.g., a recurrent neural network, or any of the various other machine learning models described herein or as may otherwise become available.

In some embodiments, the machine learning model 500 can process the historical network communication data 512, the external data 513, and the geographical information 221 at least in part by partitioning the geographical area into respective grid sections, and estimating respective probabilities that the location of the UE device 1021 is within the respective grid sections. Either alternatively or in addition to the partitioning approach, the machine learning model 500 can process the historical network communication data 512, the external data 513, and the geographical information 221 at least in part by using a regression model to calculate the location estimate for inclusion in final UE location estimates 535.

Operations 708 and 710 are directed to repeating location calculations as UEs 102 move around or otherwise as further network communication data 612 is received. At 708, the device 600 can receive additional network communication data 612 associated with an additional network communication between the UE device 1021 and the devices of the cellular communications network 100. At 710, in response to receiving the additional network communication data 612, the device 600 can include the additional network communication data 612 with the historical network communication data 512, and the device 600 can use the machine learning model 500 to reprocess, by the device 600, the historical network communication data 512 and the geographical information 221, in order to output an updated location estimate for UE device 1021. The updated location estimate can be stored for example among final UE location estimates 535.

Figure 8:
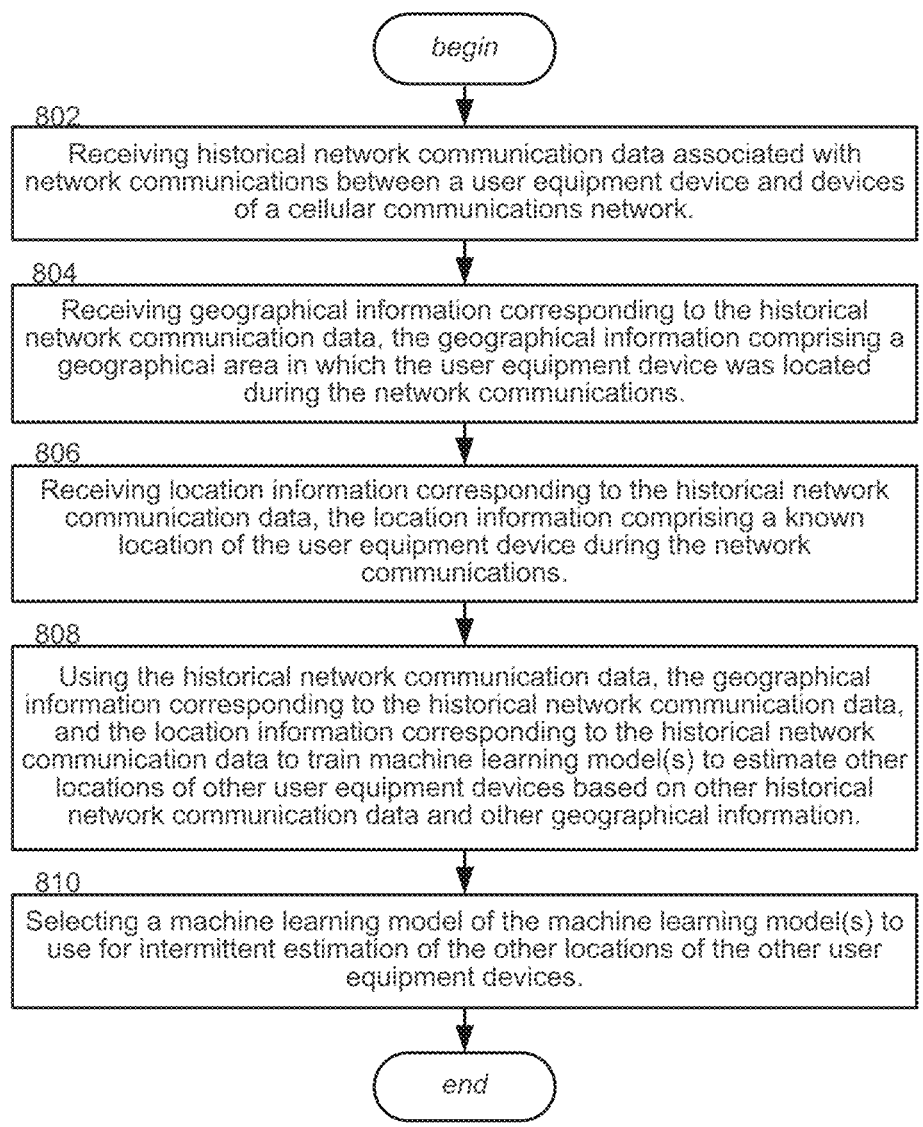
FIG. 8 is a flow diagram representing example operations to train a machine learning model to make UE location estimates, in accordance with various aspects and embodiments of the subject disclosure.

FIG. 8 is a flow diagram representing example operations to train a machine learning model to make UE location estimates, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

Figure 10:
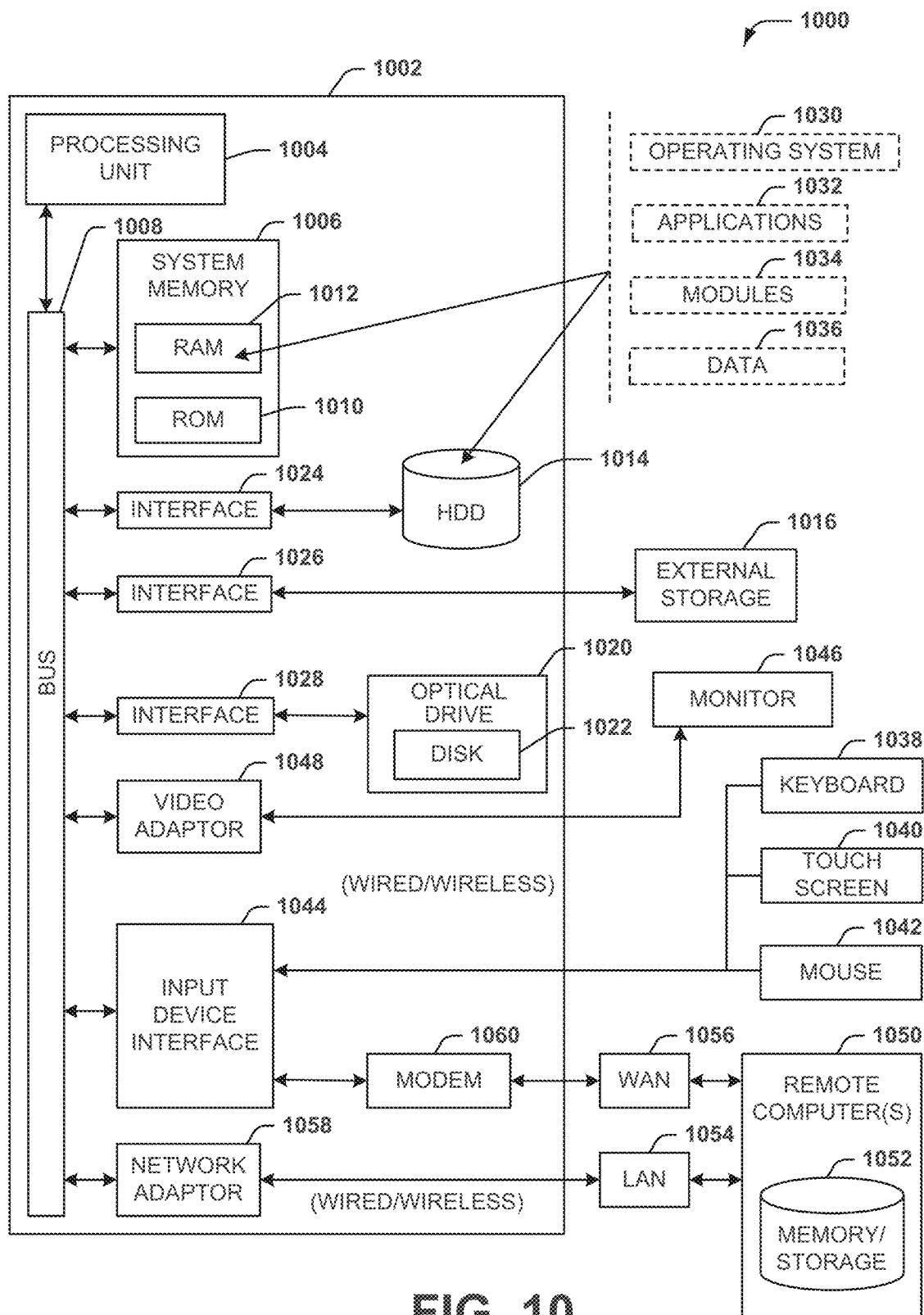
FIG. 10 is a block diagram of an example computer that can be operable to execute processes and methods in accordance with various aspects and embodiments of the subject disclosure.

The operations illustrated in FIG. 8 can be performed, for example, by a computing device such as example computing device 1000 illustrated in FIG. 10, which can be equipped to run a machine learning model in training, such as machine learning model 200 illustrated in FIG. 2. The computing device 1000 can furthermore be equipped to store or otherwise access the data illustrated in FIG. 2.

Example operations comprise operation 802, which represents receiving historical network communication data 212 associated with network communications between a user equipment device and devices of a cellular communications network. At 804, the device 1000 can receive geographical information 221 corresponding to the historical network communication data 212, the geographical information 221 comprising a geographical area in which the user equipment device was located during the network communications. At 806, the device 1000 can receive location information, such as known UE location data 211, corresponding to the historical network communication data 512, the location information 211 comprising a known location of the user equipment device during the network communications. The location information 211 corresponds to the historical network communication data 512 in that the historical network communication data 512 and the location information 211 can be for a same subset of UEs and can overlap in time, i.e., a UE was located at a known location of location information 211 at a time which overlaps with a time interval spanned by UE network communications logged in historical network communication data 512.

At 808, the device 1000 can use using the historical network communication data 512, the geographical information 221 corresponding to the historical network communication data 212, and the known location information 211 corresponding to the historical network communication data 512 to train machine learning model(s), such as machine learning model 200 or the machine learning models 401 illustrated in FIG. 4, to estimate other locations of other user equipment devices based on other historical network communication data and other geographical information. In other words, the machine learning model 200 can be trained for real-time deployment such as illustrated in FIG. 5.

At 810, in embodiments wherein multiple machine learning models 401 are trained to estimate UE locations, a machine learning model of the multiple machine learning models 401 can be selected to use for intermittent estimation of the other locations of the other user equipment devices. The term "intermittent" is used herein in respect of the fact that, even though thousands of UE location estimates can be calculated per second in some embodiments, there need not be any periodicity or regularity in calculating UE location estimates. Furthermore, because embodiments can update a location estimate of any one particular UE in response to receiving new network communication data 612 for that particular UE, there need not be any continuous or even periodic calculation with respect to the particular UE. While a device conducting location estimates according to this disclosure can operate continuously and rapidly, the output location estimates can nonetheless be described as intermittent.

Furthermore, in connection with operation 810, selecting the machine learning model of the multiple machine learning models 401 can be based at least in part on an accuracy, also referred to herein as precision, of the intermittent estimation of the other locations of the other user equipment devices. The accuracy of the intermittent estimation of the other locations of the other user equipment devices can be, e.g., any feasible precision, such as one hundred meters or less. Selecting the machine learning model of the multiple machine learning models 401 can also be based at least in part on a speed operation, namely, speed of the intermittent estimation of the other locations of the other user equipment devices. So called "long short term memory" machine learning models can be used and can represent a beneficial balance between accuracy and speed for some applications.

Figure 9:
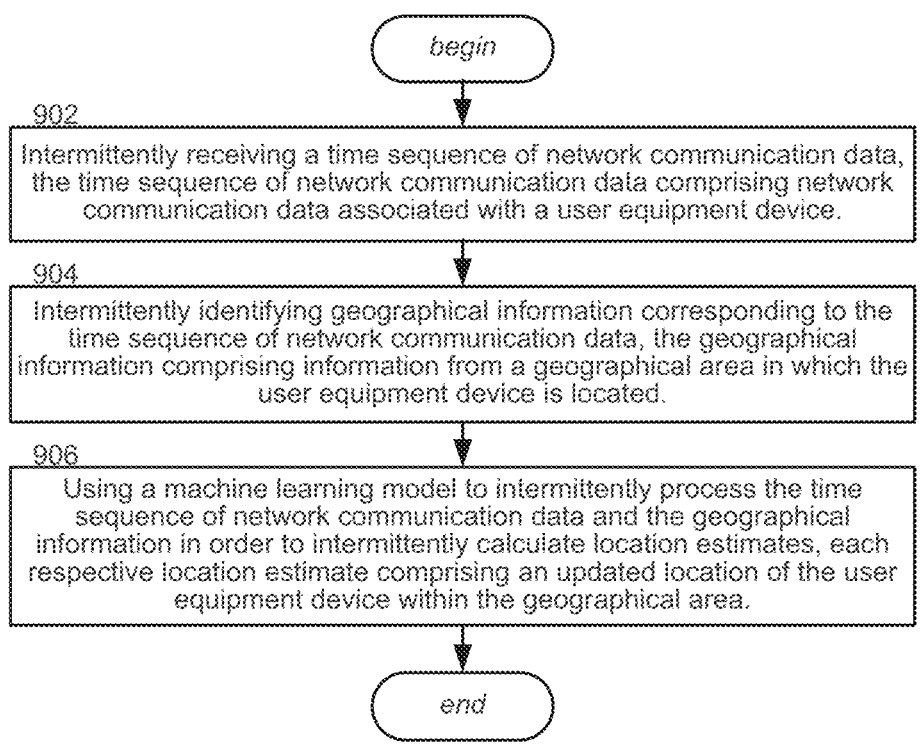
FIG. 9 is a flow diagram representing additional example operations of trained and deployed machine learning model to make real-time UE location estimates, in accordance with various aspects and embodiments of the subject disclosure.

FIG. 9 is a flow diagram representing additional example operations of trained and deployed machine learning model to make real-time UE location estimates, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9, like the operations of FIG. 7, can be performed, for example, by network device 600 hosting a real-time UE geolocation service 610, as illustrated in FIG. 6. As described in connection with FIG. 6, the real-time UE geolocation service 610 can comprise a trained machine learning model 500. Example operations comprise operation 902, which represents intermittently receiving a time sequence of network communication data, the time sequence of network communication data comprising network communication data 612 associated with a user equipment device 1021. The network communication data 612 can comprise data received over time, for multiple UEs. Data among network communication data 612 which is associated with a respective UE 1021 can be received from time to time, and data for each respective UE can be sequenced and stored in historical network communication data 512 according to times associated with each different communication associated with the respective UE 1021.

At 904, the network device 600 can intermittently identify geographical information 221 corresponding to the time sequence of network communication data 612, the geographical information 221 comprising information from a geographical area in which the user equipment device 1021 is located. For example, the network device 600 can identify geographical information 221 comprising a map or coordinate system representative of a geographical area surrounding a serving cell of a most recent network communication by UE 1021. In some embodiments, the geographical information 221 can define a very large area, e.g., an entire country such as the United States, or an entire state, such as Montana. In other embodiments, geographical information 221 can define smaller geographical areas, such as a city or an area surrounding a particular serving cell.

At 906, the network device 600 can use a machine learning model 500 to intermittently process the time sequence of network communication data 612, e.g., as stored in the historical network communication data 512, and the geographical information 221 in order to intermittently calculate location estimates, e.g., final UE location estimates 535. Each respective location estimate can comprise an updated location of a user equipment device 1021 within the geographical area identified for that user equipment device 1021 as defined by geographical information 221.

FIG. 10 is a block diagram of an example computer that can be operable to execute processes and methods in accordance with various aspects and embodiments of the subject disclosure. The example computer can be adapted to implement, for example, a server, a UE, network device, or a client device, as described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by a device comprising a processor, historical network communication data comprising a time-ordered sequence of call trace record events reported by a group of network nodes, the call trace record events comprising network communications between a user equipment and the group of network nodes;
   obtaining, by the device, timing advance information indicative of a distance between the user equipment and a serving network node of the group of network nodes;
   obtaining, by the device, time delta information indicating time intervals between the call trace record events;
   accessing, by the device, geographical information for a geographical area in which the user equipment is located and cellular coverage information associated with signals of the group of network nodes transmitted within the geographical area; and
   estimating, by the device, a location of the user equipment based on the historical network communication data, the geographical information, the cellular coverage information, the timing advance information, and the time delta information.

2. The method of claim 1, wherein the historical network communication data gathered from the time-ordered sequence of call trace record events comprises serving cell information and the timing advance information.

3. The method of claim 2, wherein the historical network communication data gathered from the time-ordered sequence of call trace record events comprises signal strength information associated with the serving cell information.

4. The method of claim 2, wherein the historical network communication data gathered from the time-ordered sequence of call trace record events comprises neighbor cell information.

5. The method of claim 4, wherein the historical network communication data gathered from the time-ordered sequence of call trace record events comprises signal strength information associated with the neighbor cell information.

6. The method of claim 1, wherein the historical network communication data gathered from the time-ordered sequence of call trace record events comprises the time delta information.

7. The method of claim 1, further comprising receiving, by the device, external data in addition to the historical network communication data, and processing the external data along with the historical network communication data in order to estimate the location of the user equipment.

8. The method of claim 7, wherein the external data comprises the cellular coverage information.

9. The method of claim 1, wherein the estimating comprises applying a recurrent neural network with long short term memory units.

10. The method of claim 1, wherein estimating the location of the user equipment comprises partitioning the geographical area into grid sections, and estimating probabilities that the location of the user equipment is within the grid sections.

11. The method of claim 1, wherein estimating the location of the user equipment comprises using a regression model to determine a location estimate.

12. The method of claim 1, further comprising,
    receiving, by the device, additional network communication data comprising an additional call trace record event between the user equipment and the serving network node; and
    in response to receiving the additional network communication data, including, by the device, the additional network communication data with the historical network communication data, and reprocessing, by the device, the historical network communication data and the geographical information, in order to output an updated location estimate.

13. A device, comprising:
    a processor; and
    a memory that stores executable instructions that, when executed by the processor, facilitate performance of operations, comprising:
      receiving historical network communication data comprising a time-ordered sequence of call trace record events reported by a group of network node equipment, the call trace record events comprising network communications between a user equipment and the group of network node equipment;
      obtaining timing advance information indicative of a distance between the user equipment and serving network node equipment of the group of network node equipment;
      obtaining time delta information indicating time intervals between the network communications;
      accessing geographical information for a geographical area in which the user equipment is located and coverage information associated with the group of network node equipment; and
      estimating a location of the user equipment based on the historical network communication data, the geographical information, the coverage information, the timing advance information, and the time delta information.

14. The device of claim 13, wherein the coverage information comprises azimuth data representative of an azimuth of network node equipment of the group of network node equipment in connection with communications with the user equipment.

15. The device of claim 13, wherein the coverage information comprises beam width data representative of a beam width of network node equipment of the group of network node equipment in connection with communications with the user equipment.

16. The device of claim 13, wherein the coverage information comprises tilt data representative of a tilt of network node equipment of the group of network node equipment in connection with communications with the user equipment.

17. The device of claim 13, wherein the geographical information comprises building polygons that define locations and shapes of buildings within the geographical area.

18. A machine-readable memory comprising executable instructions that, when executed by a processor, facilitate performance of operations, comprising:

receiving historical network communication data comprising a time-ordered sequence of call trace record events reported by network nodes, the call trace record events comprising network communications between user equipment and the network nodes;

obtaining timing advance information indicative of a distance between the user equipment and a serving network node of the network nodes;

obtaining time delta information indicating time intervals between the network communications;

accessing geographical information for a geographical area in which the user equipment is located and coverage information associated with the network nodes; and estimating a location of the user equipment based on the historical network communication data, the geographical information, the coverage information, the timing advance information, and the time delta information.

19. The machine-readable memory of claim 18, wherein the network communications comprise a time-ordered sequence of call trace record events.

20. The machine-readable memory of claim 18, wherein the historical network communication data comprises serving cell information, the timing advance information, serving cell signal strength information, neighbor cell information, or neighbor cell signal strength information.

* * * * *